United States Patent
Telichari et al.

(10) Patent No.: US 10,387,264 B1
(45) Date of Patent: Aug. 20, 2019

(54) INITIATING BACKUPS BASED ON DATA CHANGES

(71) Applicant: EMC Corporation, Hopkinton, MA (US)

(72) Inventors: Tushar P. Telichari, Bangalore (IN); Preeti Varma, Bangalore (IN); Cazeeta Almeida, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 310 days.

(21) Appl. No.: 14/750,044

(22) Filed: Jun. 25, 2015

(51) Int. Cl.
*G06F 11/14* (2006.01)

(52) U.S. Cl.
CPC ...... *G06F 11/1451* (2013.01); *G06F 11/1435* (2013.01); *G06F 2201/84* (2013.01)

(58) Field of Classification Search
CPC ............ G06F 11/1469; G06F 11/1451; G06F 11/1448; G06F 17/3007; G06F 11/1435; G06F 11/1464; G06F 17/30067; G06F 2201/84; G06F 11/1458; G06F 11/1453; G06F 17/0067
USPC ...... 707/654, 679, E17.01; 714/14; 711/162, 711/E12.001, E12.103
See application file for complete search history.

(56) References Cited

U.S. PATENT DOCUMENTS

| | | | | |
|---|---|---|---|---|
| 5,978,814 A * | 11/1999 | Miller | ............... | G06F 17/30097 707/758 |
| 6,141,773 A * | 10/2000 | St. Pierre | ............ | G06F 11/1451 711/162 |
| 6,269,381 B1 * | 7/2001 | St. Pierre | ............ | G06F 11/1448 |
| 6,704,886 B1 * | 3/2004 | Gill | ............ | G06F 11/1469 707/999.202 |
| 6,934,717 B1 * | 8/2005 | James | ............... | G06F 17/30067 |
| 7,284,104 B1 * | 10/2007 | Wu | ...................... | G06F 11/1451 707/999.202 |
| 7,809,691 B1 * | 10/2010 | Karmarkar | .......... | G06F 11/1469 707/674 |
| 7,913,044 B1 * | 3/2011 | Desai | ................... | G06F 11/1451 711/156 |
| 8,051,044 B1 * | 11/2011 | Dyatlov | .............. | G06F 11/1451 707/625 |
| 8,260,750 B1 * | 9/2012 | Gugick | ............... | G06F 11/1451 707/645 |
| 8,433,864 B1 * | 4/2013 | Narayanan | .......... | G06F 11/1448 707/645 |

(Continued)

FOREIGN PATENT DOCUMENTS

CN 103617098 A * 3/2014 ............. G06F 11/14

OTHER PUBLICATIONS

Oracle, Database Backup and Recovery Basics, Aug. 2013, Oracle, Oracle Database 11g Release 2, entire document.*

(Continued)

*Primary Examiner* — Jay A Morrison
*Assistant Examiner* — Antonio J Caiado
(74) *Attorney, Agent, or Firm* — Dergosits & Noah LLP; Todd A. Noah

(57) ABSTRACT

Initiating backups based on data changes is described. A system identifies an amount of data changed for a client since a previous backup operation for the client. The system determines whether the amount of data changed meets a threshold requirement. The system initiates a backup operation for the client if the amount of data changed meets the threshold requirement.

14 Claims, 3 Drawing Sheets

(56) References Cited

U.S. PATENT DOCUMENTS

| | | | |
|---|---|---|---|
| 8,621,166 B1* | 12/2013 | Chatterjee | G06F 11/1435 711/162 |
| 9,170,891 B1* | 10/2015 | Vincent | G06F 11/1451 |
| 9,195,670 B1* | 11/2015 | Mam | G06F 11/1451 |
| 9,286,298 B1* | 3/2016 | Gillett, Jr. | G06F 17/30067 |
| 9,424,137 B1* | 8/2016 | Mam | G06F 11/1451 |
| 9,535,907 B1* | 1/2017 | Stringham | G06F 11/1435 |
| 9,588,849 B2* | 3/2017 | Sinha | G06F 11/1469 |
| 9,740,571 B1* | 8/2017 | Chopra | G06F 11/1461 |
| 9,760,445 B1* | 9/2017 | Chopra | G06F 11/1451 |
| 9,875,041 B1* | 1/2018 | Redko | G06F 3/0619 |
| 9,998,537 B1* | 6/2018 | O'Connell | H04L 67/1095 |
| 2002/0107877 A1* | 8/2002 | Whiting | G06F 11/1453 |
| 2006/0248294 A1* | 11/2006 | Nedved | G06F 11/1464 711/162 |
| 2008/0244205 A1* | 10/2008 | Amano | G06F 11/1451 711/162 |
| 2009/0013138 A1* | 1/2009 | Sudhakar | G06F 11/1435 711/162 |
| 2009/0210462 A1* | 8/2009 | Arakawa | G06F 11/1458 |
| 2010/0005259 A1* | 1/2010 | Prahlad | G06F 11/1435 711/162 |
| 2010/0049930 A1* | 2/2010 | Pershin | G06F 11/1451 711/162 |
| 2010/0077165 A1* | 3/2010 | Lu | G06F 11/1451 711/162 |
| 2010/0169590 A1* | 7/2010 | Gordon-Carroll | G06F 11/1451 711/162 |
| 2010/0169591 A1* | 7/2010 | Atluri | G06F 11/1469 711/162 |
| 2010/0169668 A1* | 7/2010 | Gordon-Carroll | G06F 11/1456 713/193 |
| 2010/0228913 A1* | 9/2010 | Czezatke | G06F 11/1451 711/112 |
| 2010/0332454 A1* | 12/2010 | Prahlad | G06F 17/30082 707/654 |
| 2011/0252208 A1* | 10/2011 | Ali | G06F 11/1451 711/162 |
| 2012/0089572 A1* | 4/2012 | Raichstein | G06F 11/1461 707/645 |
| 2012/0246427 A1* | 9/2012 | Agombar | G06F 11/1448 711/162 |
| 2013/0339643 A1* | 12/2013 | Tekade | G06F 17/30581 711/162 |
| 2013/0346709 A1* | 12/2013 | Wang | G06F 11/1456 711/162 |
| 2014/0236902 A1* | 8/2014 | Zhu | G06F 11/1464 707/654 |
| 2014/0258236 A1* | 9/2014 | Vijayan | G06F 11/1448 707/639 |
| 2014/0325170 A1* | 10/2014 | Aswathanarayana | G06F 9/45558 711/162 |
| 2015/0142745 A1* | 5/2015 | Tekade | G06F 11/1451 707/646 |
| 2015/0212895 A1* | 7/2015 | Pawar | G06F 11/1448 707/649 |
| 2015/0363282 A1* | 12/2015 | Rangasamy | G06F 11/2033 714/4.12 |
| 2016/0147607 A1* | 5/2016 | Dornemann | G06F 16/188 711/162 |
| 2016/0162369 A1* | 6/2016 | Ahn | G06F 11/1451 707/654 |

OTHER PUBLICATIONS

Comodo, Comodo BackUp—User Guide, 2015, Comodo Security Solutions Inc., Software Version 4.4, entire document.*

Red Gate Software, Creating Backups: Select the Backup Type and Databases, 2007, Red Gate Software, pp. 1-2.*

EMC, EMC NetWorker 8.1 Service Pack 1 Administation Guide, EMC Published May 26, 2014, entire document.*

* cited by examiner

INITIATING BACKUPS BASED ON DATA CHANGES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

A backup/restore application may perform scheduled backup operations in an enterprise environment based on a configurable data protection policy. A data protection policy may be based on factors such as a backup window, a service level agreement with third parties, and the processing load on the production computer to be backed up. If the time difference between two scheduled backup operations is long, data loss may occur after the previous backup operation and before the next scheduled backup operation. For example, if an enterprise schedules backup operations on a server at 9:00 P.M. every day, the data that is changed after 9:00 P.M. is not protected until the next backup operation is initiated at 9:00 P.M. on the subsequent day.

Embodiments herein initiate backups based on data changes. An amount of data changed for a client since a previous backup operation for the client is identified. A determination is made whether the amount of data changed meets a threshold requirement. A backup operation is initiated for the client in response to a determination that the amount of data changed meets the threshold requirement.

For example, a backup/restore application accesses, via a write tracking driver, a block-based bitmap for data changes in a server to identify that 14% of the server's stored data has changed since the previous backup operation at 9:00 P.M. last night. The backup/restore application determines whether the 14% stored data change for the server exceeds the 10% change threshold set by the server's user. The backup/restore application initiates a backup operation for the server at 12:00 noon, 9 hours prior to the next scheduled backup operation, because the 14% stored data change for the server exceeds the 10% change threshold set by the server's user. The backup/restore application overcomes the legacy problem of risking the loss of significant amounts of data between scheduled backup operations.

Figure 1:
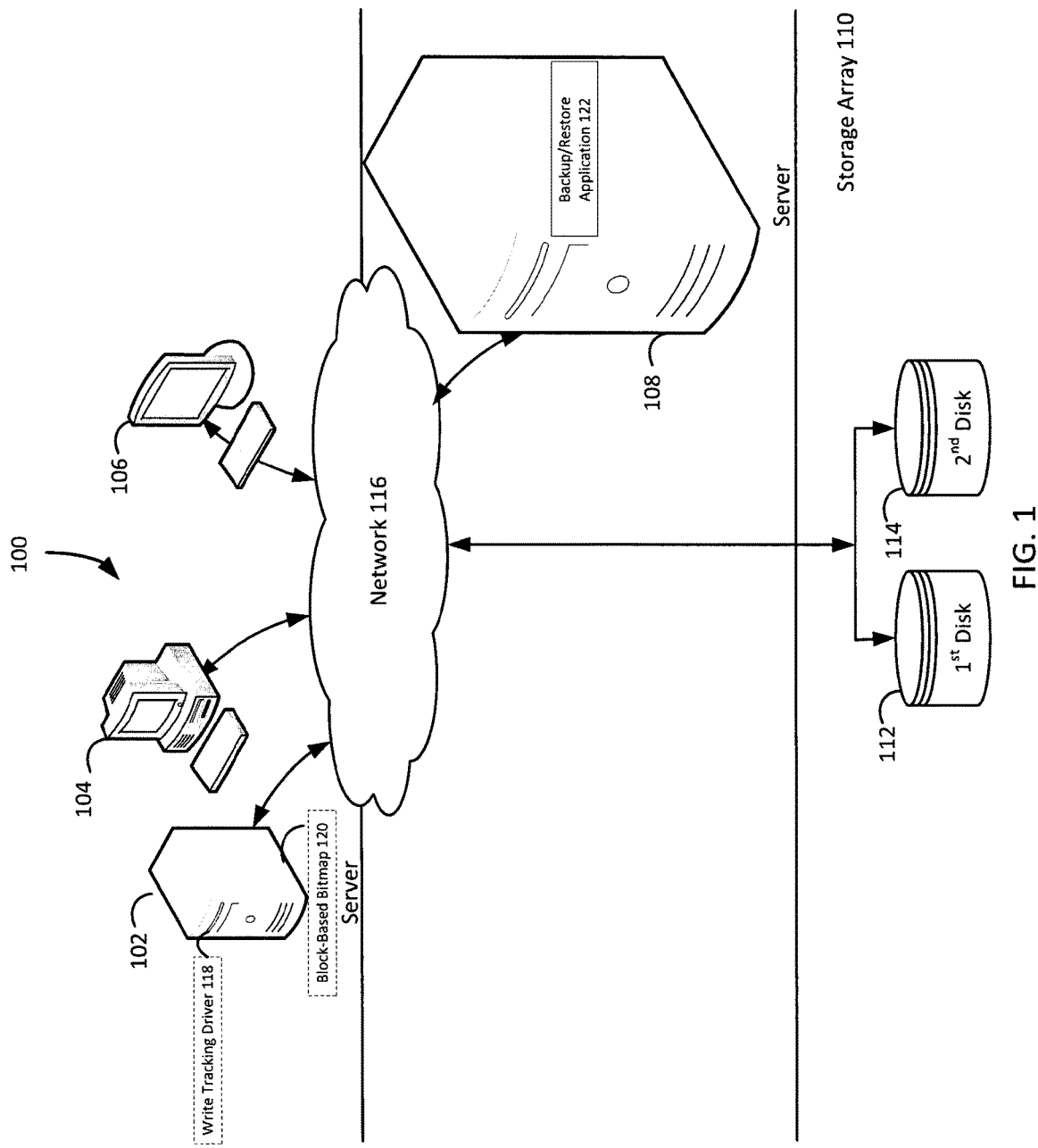
FIG. 1 illustrates a block diagram of an example system for initiating backups based on data changes, under an embodiment.

FIG. 1 illustrates a block diagram of a system that implements initiating backups based on data changes, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a server 102, the second client 104 as a personal computer 104, and the third client 106 as an iMac® 106, each of the clients 102-106 may be any type of computer. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 300 depicted in FIG. 3 and described below.

The first client 102 may include a write tracking driver 118 which identifies input/output operations on a production volume by intercepting input/output operations to the production volume, and which may store a record of such operations in a block-based bitmap 120. A backup/restore application 122 creates backup files of data objects for the clients 102-106, and may execute a rollback based on the backup files. Although FIG. 1 depicts the write tracking driver 118 and the block-based bitmap 120 residing on the first client 102, the write tracking driver 118 and the block-based bitmap 120 may reside on any of the clients 102-106, or in any combination of partially on the server 108 and partially on any of the clients 102-106. While FIG. 1 depicts the backup/restore application 122 residing completely on the server 108, the backup/restore application 122 may reside completely on the clients 102-106, or in any combination of partially on the server 108 and partially on the clients 102-106. Even though the following paragraphs describe EMC Corporation's Avamar® backup/restore application and EMC Corporation's NetWorker® backup/restore application as examples of the backup/restore application 122, the backup/restore application 122 may be any other backup/restore application which provides the backup/restore functionalities described in the Background section.

The backup/restore application 122 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 122 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 122 identifies an amount of data changed for a client since a previous backup operation for the client. For example, at 12:00 noon a daemon processing executing for the backup/restore application 122 accesses, via the write tracking driver 118, the block-based bitmap 120 for data changes in the server 102 to identify that 14% of the server's stored data has changed since the previous backup operation at 9:00 P.M. last night.

Alternatively, the backup/restore application 122 may identify the amount of data changed for a client since the previous backup operation for the client by identifying multiple time stamps for corresponding multiple files and comparing the multiple time stamps to a time associated with the previous backup operation. For example, at 12:00 noon a daemon process executing for the backup/restore application 122 identifies a dozen timestamps, corresponding to a dozen files, of times after midnight, each of which is after the most recent backup operation at 9:00 P.M.

The amount of data changed may be the total amount of data changed for a client, an amount of data changed for the client relative to a total amount of data for the client, and/or an amount of data changed for the client per a period of time. For example, the backup/restore application 122 can identify that 14 gigabytes of the stored data has changed for the first client 102, that 14% of the stored data has changed for the first client 102, or that 1.4 gigabytes per hour of stored data has changed for the first client 102.

When the backup/restore application 122 identifies an amount of data changed for a client, the monitored client may actually be multiple clients. For example, the backup/restore application 122 identifies an amount of data changed for the first client 102, the second client 104, and the third client 106 since a previous backup operation at 9:00 P.M. for the first client 102, the second client 104, and the third client 106.

After identifying the amount of data changed, the backup/restore application 122 determines whether the amount of data changed meets a threshold requirement. For example, the backup/restore application 122 determines whether the 14% stored data change for the server 102 exceeds the 10% change threshold set by the server's user. In addition or as an alternative to the user of the first client 102, the threshold requirement may be configurable by a system administrator, such as the data protection administrator for the enterprise that uses the first client 102, the second client 104, and the third client 106.

The threshold requirement may be based on the total amount of data changed for a client, an amount of data changed for the client relative to a total amount of data for the client, and/or an amount of data changed for the client per a period of time. For example, the backup/restore application 122 can compare the amount of data changed for the first client 102 to a threshold requirement based on 10 gigabytes of the stored data that has changed for the first client 102, a threshold requirement based on 10% of the stored data that has changed for the first client 102, or a threshold requirement based on 1.0 gigabytes per hour of stored data that has changed for the first client 102.

The backup/restore application 122 initiates a backup operation for the client if the amount of data changed meets the threshold requirement. For example, the backup/restore application 122 initiates a backup operation for the server 102 at 12:00 noon, 9 hours prior to the next scheduled backup operation, because the 14% stored data change for the server 12 exceeds the 10% change threshold set by the server's user. If the amount of data changed does not meet the threshold requirement, the backup/restore application 122 continues checking for the amount of data changed. While periodically checking for the amount of data changed, the backup/restore application 122 continues performing scheduled backup operations, such as partial backups of only changed data each weekday at 9:00 P.M., and full backups of all data on weekends at 9:00 P.M. The backup/restore application 122 overcomes the legacy problem of risking the loss of significant amounts of data between scheduled backup operations.

Figure 2:
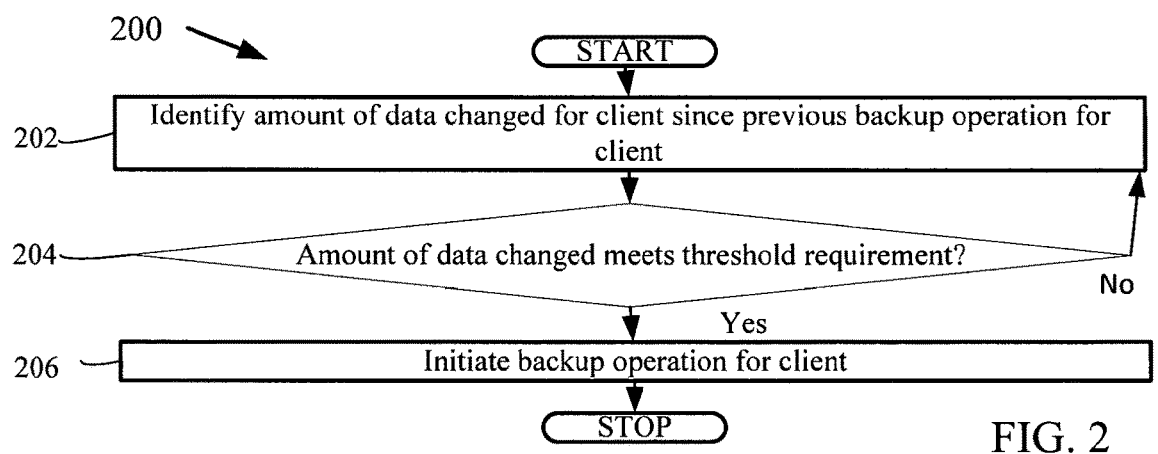
FIG. 2 is a flowchart that illustrates a method of initiating backups based on data changes, under an embodiment.

FIG. 2 is a flowchart that illustrates a method for initiating backups based on data changes, under an embodiment. Flowchart 200 illustrates method acts illustrated as flowchart blocks for certain steps involved in and/or between the clients 102-106 and/or the server 108 of FIG. 1.

An amount of data changed for a client since a previous backup operation for the client is identified, block 202. For example, at 12:00 noon a daemon process executing for the backup/restore application 122 accesses, via the write tracking driver 118, the block-based bitmap 120 for data changes in the server 102 to identify that 14% of the server's stored data has changed since the previous backup operation at 9:00 P.M. last night.

After identifying the amount of data changed, a determination is made whether the amount of data changed meets a threshold requirement, block 204. For example, the backup/restore application 122 determines whether the 14% stored data change for the server 102 exceeds the 10% change threshold set by the server's administrator. If the amount of data changed meets the threshold requirement, the method 200 continues to block 206. If the amount of data changed does not meet the threshold requirement, the method 200 returns to block 204 to continue checking for the amount of data changed.

A backup operation is initiated for the client in response to a determination that the amount of data changed meets the threshold requirement, block 206. For example, the backup/restore application 122 initiates a backup operation for the server 102 at 12:00 noon, 9 hours prior to the next scheduled backup operation, because the 14% stored data change for the server 12 exceeds the 10% change threshold set by the server's user. The backup/restore application 122 overcomes the legacy problem of risking the loss of significant amounts of data between scheduled backup operations.

Although FIG. 2 depicts the blocks 202-206 occurring in a specific order, the blocks 202-206 may occur in another order. In other implementations, each of the blocks 202-206 may also be executed in combination with other blocks and/or some blocks may be divided into a different set of blocks.

Figure 3:
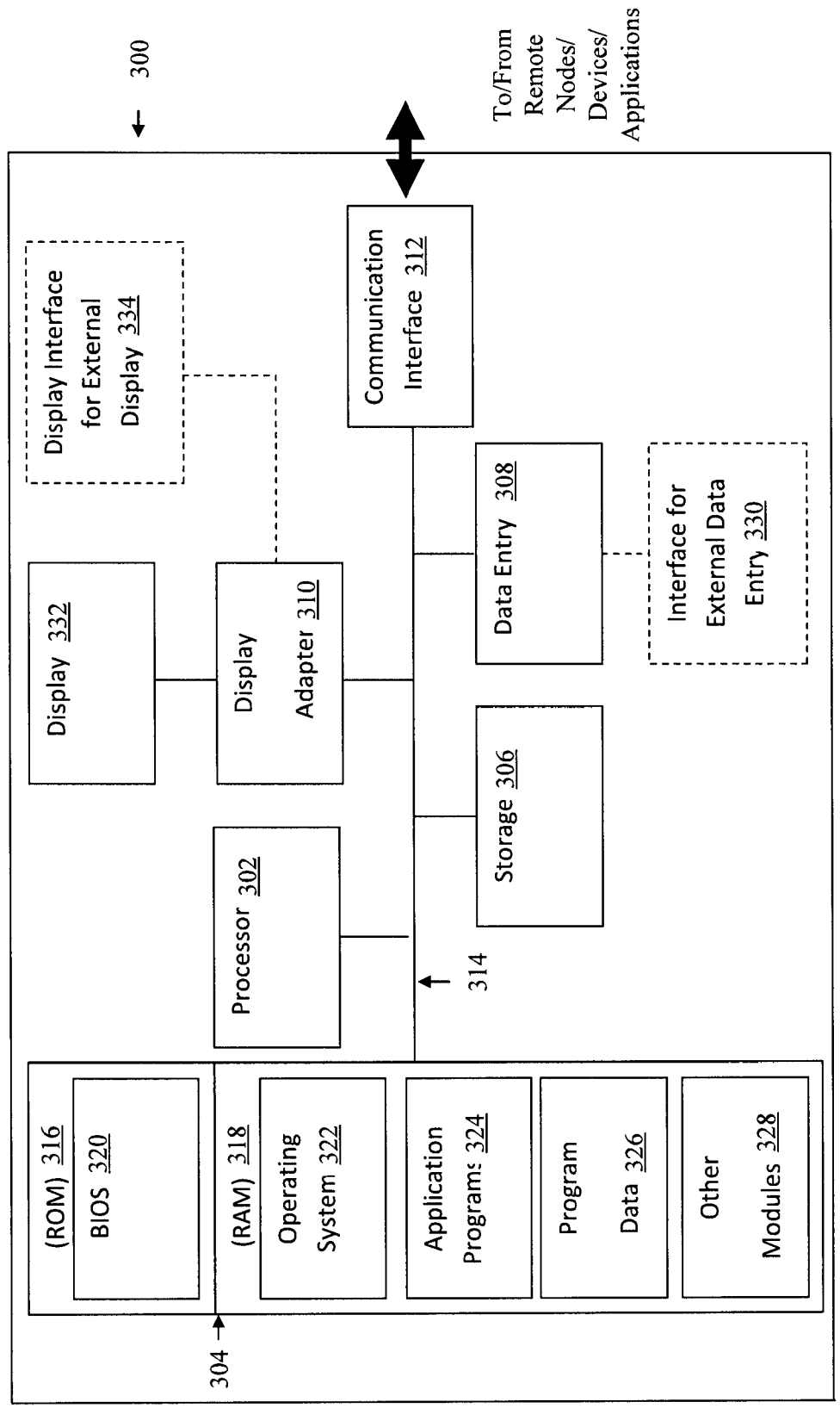
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for initiating backups based on data changes, the system comprising:

a processor-based application, which when executed on a computer, will cause the processor to:

identify, by a daemon process running on a client computing device, at a time before a next scheduled operation for the client computing device, an amount of data changed since a previous backup operation by accessing, via a write tracking driver in communication with the daemon process, a block-based bitmap for data changes, wherein the write tracking driver identifies input and output operations associated with the client computing device and stores a record of the input and the output operations in the block-based bitmap;

determine, by the daemon process, whether the identified amount of data changed meets or exceeds a threshold requirement, at least one of the amount of data changed or the threshold requirement being based on at least one of a total amount of data changed for the client, an amount of data changed for the client relative to a total amount of data for the client, or an amount of data changed for the client per a period of time;

initiate, by the daemon process in communication with a backup/restore application over a network, a backup operation via the backup/restore application before the next scheduled backup operation for the client computing device when the identified amount of data changed meets or exceeds the threshold requirement;

monitor the amount of data changed from the previous backup operation when the identified amount of data changed is below the threshold requirement; and initiate a backup operation before the next scheduled backup operation for the client computing device when the monitored amount of data changed meets or exceeds the threshold requirement.

2. The system of claim 1, wherein identifying the amount of data changed for the client since the previous backup operation for the client further includes identifying a plurality of time stamps corresponding to a plurality of files and comparing the plurality of time stamps to a time associated with the previous backup operation.

3. The system of claim 1, wherein the client comprises a plurality of clients.

4. The system of claim 1, wherein the threshold requirement is configurable by at least one of a system administrator and a user of the client.

5. The system of claim 1, wherein the processor-based application further causes the processor to identify the amount of data changed for the client since the previous backup operation for the client in response to a determination that the amount of data changed does not meet the threshold requirement.

6. A computer-implemented method for initiating backups based on data changes, the method being executed by a computer processor and comprising:

identifying, by a daemon process running on a client computing device, at a time before a next scheduled operation for the client computing device, an amount of data changed since a previous backup operation by accessing, via a write tracking driver in communication with the daemon process, a block-based bitmap for data changes, wherein the write tracking driver identifies input and output operations associated with the client computing device and stores a record of the input and the output operations in the block-based bitmap;

determining, by the daemon process, whether the identified amount of data changed meets or exceeds a threshold requirement;

initiating, by the daemon process in communication with a backup/restore application over a network, a backup operation via the backup/restore application before the next scheduled backup operation for the client computing device when the identified amount of data changed meets or exceeds the threshold requirement;

monitoring the amount of data changed from the previous backup operation when the identified amount of data changed is below the threshold requirement, at least one of the amount of data changed or the threshold requirement being based on at least one of a total amount of data changed for the client, an amount of data changed for the client relative to a total amount of data for the client, or an amount of data changed for the client per a period of time; and initiating a backup operation before the next scheduled backup operation for the client computing device when the monitored amount of data changed meets or exceeds the threshold requirement.

7. The method of claim 6, wherein identifying the amount of data changed for the client since the previous backup operation for the client further includes identifying a plurality of time stamps corresponding to a plurality of files and comparing the plurality of time stamps to a time associated with the previous backup operation.

8. The method of claim 6, wherein the client comprises a plurality of clients.

9. The method of claim 6, wherein the threshold requirement is configurable by at least one of a system administrator and a user of the client.

10. The method of claim 6, wherein the method further comprises identifying the amount of data changed for the client since the previous backup operation for the client in response to a determination that the amount of data changed does not meet the threshold requirement.

11. A computer program product, comprising a non-transitory computer-readable medium having a computer-readable program code embodied therein to be executed by one or more processors, the program code including instructions to:

identify, by a daemon process running on a client computing device, at a time before a next scheduled operation for the client computing device, an amount of data changed since a previous backup operation by accessing, via a write tracking driver in communication with the daemon process, a block-based bitmap for data changes, wherein the write tracking driver identifies input and output operations associated with the client computing device and stores a record of the input and the output operations in the block-based bitmap;

determine, by the daemon process, whether the identified amount of data changed meets or exceeds a threshold requirement;

initiate, by the daemon process in communication with a backup/restore application over a network, a backup operation via the backup/restore application before the next scheduled backup operation for the client computing device when the identified amount of data changed meets or exceeds the threshold requirement;

monitor the amount of data changed from the previous backup operation when the identified amount of data changed is below the threshold requirement, at least one of the amount of data changed or the threshold requirement being based on at least one of a total amount of data changed for the client, an amount of data changed for the client relative to a total amount of data for the client, or an amount of data changed for the client per a period of time; and initiate a backup operation before the next scheduled backup operation for the client computing device when the monitored amount of data changed meets or exceeds the threshold requirement.

12. The computer program product of claim 11, wherein identifying the amount of data changed for the client since the previous backup operation for the client further includes identifying a plurality of time stamps corresponding to a plurality of files and comparing the plurality of time stamps to a time associated with the previous backup operation.

13. The computer program product of claim 11, wherein the client comprises a plurality of clients.

14. The computer program product of claim 11, wherein the threshold requirement is configurable by at least one of a system administrator and a user of the client.

* * * * *